United States Patent
Blackman

Patent Number: 5,884,730
Date of Patent: Mar. 23, 1999

[54] FRICTION BRAKE ASSEMBLY

[75] Inventor: William Oscar Blackman, Indianapolis, Ind.

[73] Assignee: General Motors Corporation, Detroit, Mich.

[21] Appl. No.: 58,425

[22] Filed: Apr. 9, 1998

[51] Int. Cl.[6] .............................. F16D 55/36; F16D 13/50
[52] U.S. Cl. .................. 188/71.5; 192/70.28; 188/73.31
[58] Field of Search .................................. 188/71.1, 71.2, 188/72.3, 106 F, 170, 73.31, 73.32; 192/70.17, 70.19, 70.2, 70.21, 70.28, 85 AA

[56] References Cited

U.S. PATENT DOCUMENTS

| | | | |
|---|---|---|---|
| 3,747,729 | 7/1973 | Storer, Jr. | 192/70.28 |
| 4,023,654 | 5/1977 | Winzeler | 188/170 |
| 4,548,306 | 10/1985 | Hartz | 192/70.28 |
| 4,607,730 | 8/1986 | Paisely | 188/71.5 |
| 4,615,418 | 10/1986 | Atwell | 188/170 |
| 4,802,564 | 2/1989 | Stodt | 188/71.5 |

*Primary Examiner*—Chris Schwartz
*Attorney, Agent, or Firm*—Jeffrey A. Sedlar; Donald F. Scherer

[57] ABSTRACT

A friction brake assembly has a plurality of first plates having external teeth engaged in spline teeth formed in a housing, second plates having internal teeth engaged in spline teeth on a transmission component, and a backing plate disposed in an annular groove in the first housing. The backing plate has a toothed outer periphery which is alignable with the spline teeth of the housing. The teeth on the backing plate and the housing spline teeth have alignable apertures or bores formed therein and adapted to receive at least one pin member which restrains relative rotation between the housing and the backing plate. The pin has a finger portion which engages in a second aperture in the housing to inhibit unintentional removal of the pin.

2 Claims, 2 Drawing Sheets

FRICTION BRAKE ASSEMBLY

TECHNICAL FIELD

This invention relates to friction brake assemblies, and more particularly, to multiple disc type brake assemblies.

BACKGROUND OF THE INVENTION

Transmission ratio brake assemblies include a plurality of friction discs in a brake pack. The discs are alternately splined at the outside diameter and inside diameter, respectively. Generally, the outside diameter spline discs are in toothed engagement with a spline formed in a transmission housing while the inside diameters spline discs are in toothed engagement with a rotatable transmission component, such as a hub or a gear.

A fluid operated piston, slidably disposed in the housing is pressurized to frictionally engage the discs. A backing plate is also splined with the housing and restrained in one axial direction by a retaining ring.

The backing plate and retaining ring provide reaction members to limit axial movement in one direction of the brake back during brake engagement. The reaction force imposed on the backing plate and retaining ring is transmitted to the housing through a groove wall in which the ring is disposed.

In most transmissions, at least one brake assembly is located at one end of the housing, such that visual inspection of the retaining ring placement is difficult. If the ring is not properly seated, it will generally disengage in the groove leaving the brake inoperable at final test on the assembly line. This gives rise to time consuming repair since the transmission must be disassembled, repaired and reassembled.

SUMMARY OF THE INVENTION

It is an object of the present invention to provide an improved assembly and retaining mechanism for a disc brake assembly in a power transmission.

In one aspect of the present invention, a brake assembly in a transmission housing has a toothed backing plate with the teeth disposed in an annular groove axially aligned with the teeth of a spline member formed in the transmission housing.

In another aspect of the present invention, the spline teeth on the backing plate and the housing have alignable axially extending doors in which a pin member is inserted to prevent relative rotation between the backing plate and the housing.

In yet another aspect of this invention, the pin member has a finger portion which extends radially outward relative to the transmission housing for engagement in a radially extending bore formed in the housing to prevent inadvertent removal of the pin from the backing plate and housing.

DESCRIPTION OF AN EXEMPLARY EMBODIMENT

Figure 1:
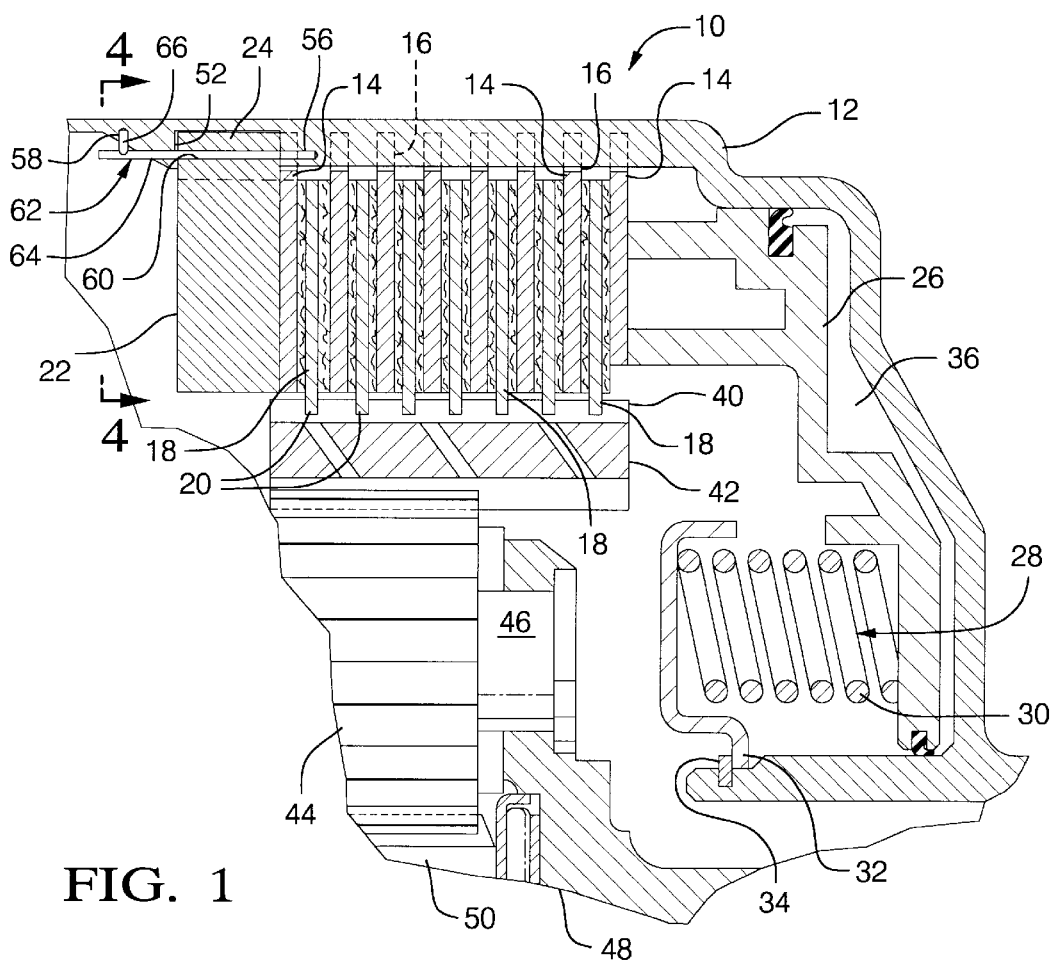
FIG. 1 is a cross-sectional elevational view of a portion of a transmission incorporating the present invention.
Figure 4:
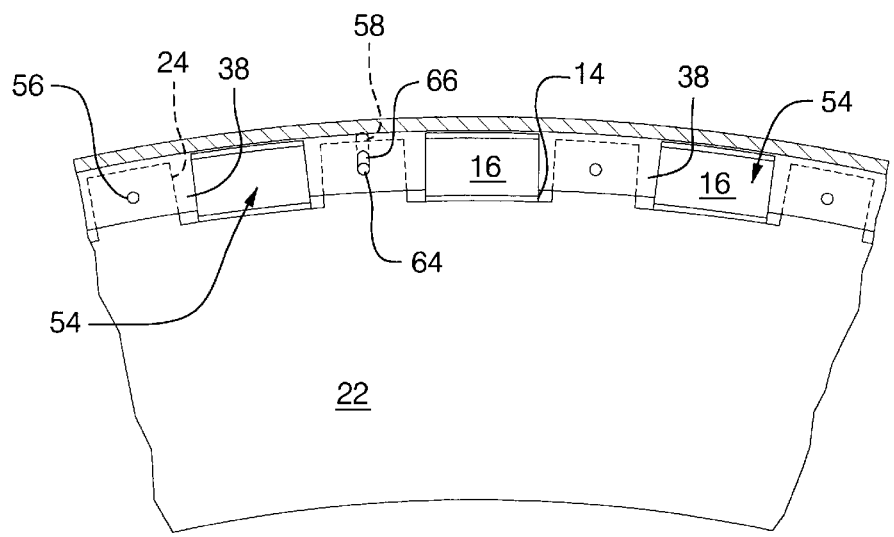
FIG. 4 is a view taken along line 4—4 of FIG. 1.

Referring to the drawings, wherein like characters represent the same or corresponding parts throughout the several views, there is seen in the drawings a brake assembly 10 disposed in a transmission housing 12. The brake assembly 10 includes a plurality of friction discs 14 having outer diameter spline teeth 16, a plurality of friction discs 18 having inner spline teeth 20, a backing plate 22 having outer spline teeth 24, a piston 26 slidably disposed in the housing 12, and a reaction or return spring assembly 28. The return spring assembly 28 is comprised of a plurality of helical springs 30, an annular retainer plate 32 and a locking ring 34.

The piston 26 is pressurized through a chamber 36, such that the piston 26 moves axially against springs 30 to enforce frictional engagement between the discs 14 and 18. The backing plate 22 prevents or limits axial movement of the brake assembly 10 in a leftward direction, as viewed in FIGS. 1, 2 and 3, such that the frictional forces between discs 14 and 18 will cause full brake engagement.

The spline teeth 16, of the discs 14, are engaged in spline teeth 38 formed in the housing 12. The spline teeth 20 of friction discs 18 are engaged in spline teeth 40 formed on the outer diameter of a conventional ring gear 42. The ring gear 42 meshes with a plurality of pinion gears 44 which are rotatably mounted on pinion pins 46 and secured in a cage or carrier 48.

The pinion gears 44 mesh with a sun gear 50, in a well known manner, such that the sun gear, ring gear and pinion gears, along with carrier 48 form a conventional planetary gear mechanism. When the brake 10 is fully engaged by the piston 26, the ring gear 42 will be held stationary, such that rotation of the sun gear 50 will cause a reduced rotation of the carrier 48 in a well known manner.

The housing 12 has an annular groove 52 formed therein which interrupts the spline teeth 38. The backing plate 22 has the spline teeth 24 thereof disposed in the annular groove 52. During assembly, the spline teeth 24 are aligned with spaces 54 between the spline teeth 38 and the backing plate 22 is then rotated, such that the spline teeth 24 align with the spline teeth 38.

The housing 12 has an axially extending aperture 56 and a radially extending aperture 58. These apertures are orthogonal and may be formed in every tooth of the spine teeth 38 or in selected equally angularly spaced spline teeth 38. The backing plate 22 has a bore 60 formed in each spline tooth which is alignable with the aperture 56 formed in the housing 22. A pin member 62 is inserted in the aperture 56 and bore 60, such that the backing plate 22 is prevented from rotating relative to the housing 12 after the assembly is completed.

Figure 2:
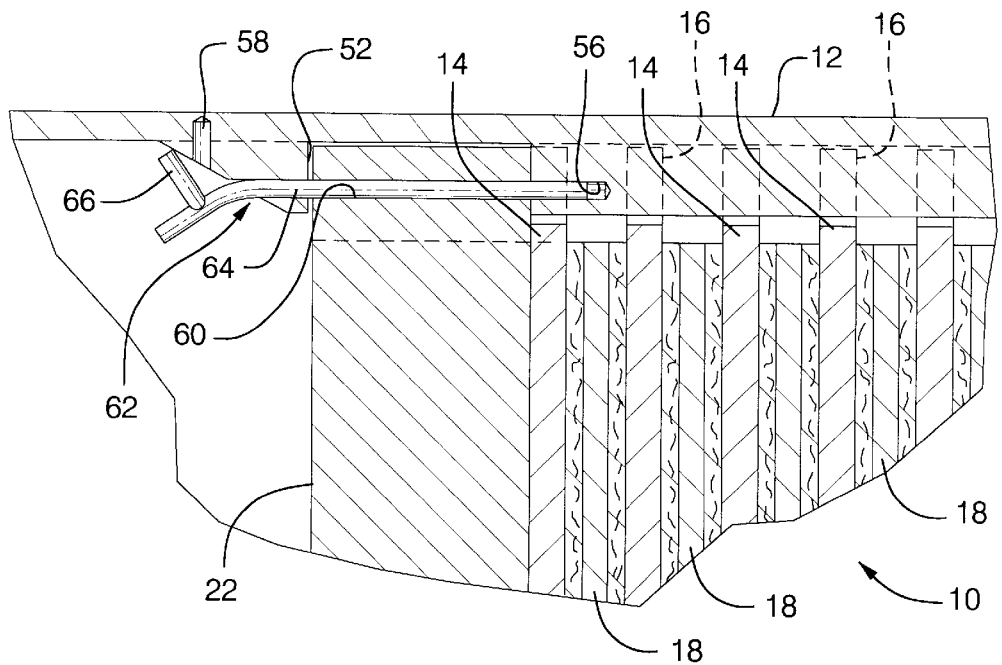
FIG. 2 is an enlarged portion of the brake assembly shown in FIG. 1 partially assembled.
Figure 3:
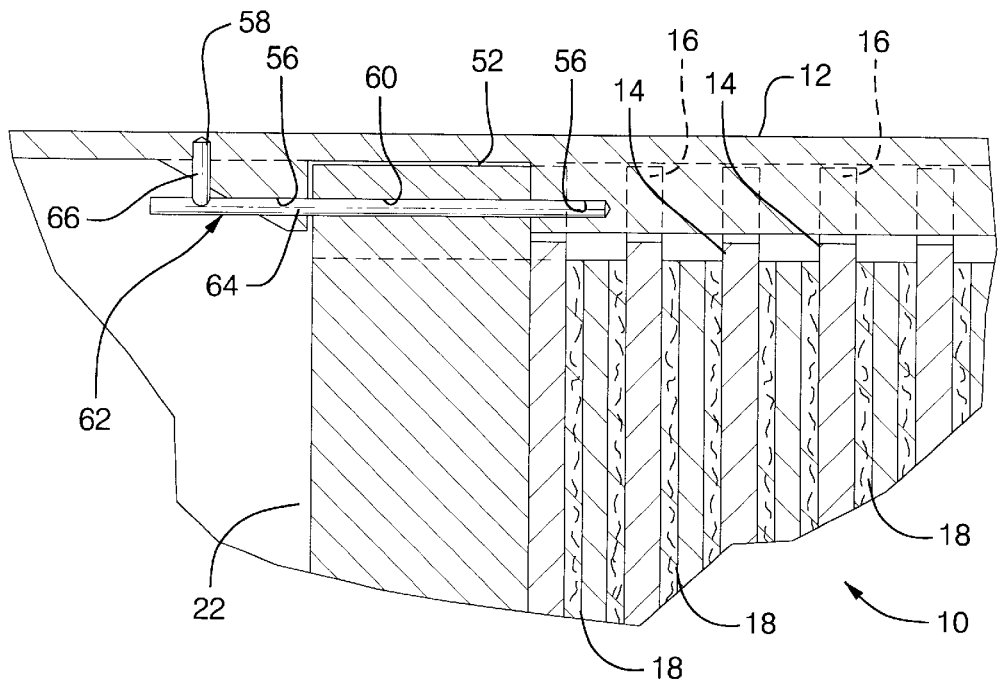
FIG. 3 is an enlarged view of a portion of the brake assembly shown in FIG. 1 with the pin fully assembled.

As noted in FIG. 2, the pin 62 has a body 64 and a finger 66. The pin 62 is flexible, permitting the body 64 to be resiliently deflected during assembly, such that the finger 66 will be inserted into the radial aperture 58 to prevent inadvertent release of the pin 62 from the housing 12. Also, the assembly of the brake 10 might be in the bottom of a transmission case, such that visual inspection of the pin insertion is not readily permitted. The finger 66, upon engaging the aperture 58, will cause a clicking or snapping sound informing the assembler that the pin has been fully engaged within the transmission housing and removal of the pin will not be inadvertent.

The pin 62 might be installed at equiangular locations about the housing 12 or, if one pin is sufficient to retain the plate, a single pin 62 might be utilized to prevent disassembly of the brake 10. With this arrangement, the axial reaction force of the brake assembly 10 is taken by the full width of the teeth 38 and 24, rather than by a snap ring or locking ring and a groove lip which is not as robust as the spline teeth.

It should also be noted that the auditory response of the pin 62 engaging the aperture 58 provides the operator with ensurance that the brake assembly has been completed.

I claim:

1. A brake assembly comprising:

a housing having a piston chamber, a toothed spline portion, and an annular groove interrupting a portion of said spline portion;

a piston slidably disposed in said piston chamber;

a plurality of brake discs each having a toothed outer periphery slidably disposed in said housing spline portion;

a backing plate having a toothed outer periphery disposed in said annular groove formed in said housing, said backing plate being aligned in said housing with the teeth of said outer toothed periphery being axially aligned with the teeth of said toothed spline portion, selective teeth of said toothed outer periphery having axially formed apertures;

axially extending apertures formed in selective teeth of said toothed spline portion axially aligned with at least some of said apertures in said selective teeth on said toothed outer periphery; and at least one pin disposed in said backing plate and said housing by extending into at least one of said axially aligned apertures on each of said backing plate and said housing.

2. The brake assembly defined in claim 1 further comprising:

a radial aperture formed in said housing adjacent one end of each housing tooth having said axially extending aperture formed therein; and said at least one pin having a finger portion disposed substantially perpendicular to a body portion thereof, said finger portion being inserted in said radial aperture when said body portion is inserted into said respective axially aligned apertures of said housing and said backing plate.

* * * * *